(12) United States Patent
Usami

(10) Patent No.: US 6,677,988 B2
(45) Date of Patent: Jan. 13, 2004

(54) IMAGE CONVERSION PROCESSING METHOD AND APPARATUS, AND RECORDING MEDIUM

(75) Inventor: Akihiro Usami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/923,463

(22) Filed: Sep. 4, 1997

(65) Prior Publication Data

US 2003/0086004 A1 May 8, 2003

(30) Foreign Application Priority Data

Sep. 5, 1996 (JP) ............................................. 8-234792

(51) Int. Cl.$^7$ ............................................. H04N 17/00
(52) U.S. Cl. ........................ 348/179; 348/184; 345/591
(58) Field of Search ............................... 348/207, 222, 348/223, 224, 225, 227, 228, 254, 272, 273, 333.01, 333.05, 207.99, 207.1, 222.1–225.1; 345/589, 591, 601, 904; 358/500, 518, 519, 520, 527; 382/162, 166, 167, 311

(56) References Cited

U.S. PATENT DOCUMENTS

| | | | | |
|---|---|---|---|---|
| 5,103,407 A | * | 4/1992 | Gabor | 345/601 |
| 5,204,736 A | * | 4/1993 | Abe | 358/500 |
| 5,483,259 A | * | 1/1996 | Sachs | 345/600 |
| 5,499,040 A | * | 3/1996 | McLaughlin et al. | 345/904 |
| 5,589,853 A | * | 12/1996 | Fujiki | 345/601 |
| 5,638,117 A | * | 6/1997 | Engeldrum et al. | 348/904 |
| 5,791,781 A | * | 8/1998 | Park et al. | 345/690 |
| 5,870,069 A | * | 2/1999 | Choh et al. | 348/589 |
| 5,915,076 A | * | 6/1999 | Sugita | 395/109 |
| 6,072,464 A | * | 6/2000 | Ozeki | 348/603 |
| 6,118,455 A | * | 9/2000 | Hidaka et al. | 345/431 |
| 6,198,553 B1 | * | 3/2001 | Yamamoto et al. | 358/520 |
| 6,240,204 B1 | * | 5/2001 | Hidaka et al. | 382/167 |
| 6,320,980 B1 | * | 11/2001 | Hidaka | 382/167 |

* cited by examiner

Primary Examiner—Ngoc-Yen Vu
(74) Attorney, Agent, or Firm—Fitzpatrick, Cella, Harper & Scinto

(57) ABSTRACT

A plurality of reduced images (for the color temperature and the color rendering property) of a read image of an original are displayed. The user is asked to select a reduced image close to the color of the original from among the plurality of displayed reduced images. Each parameter of the color is determined based on the selected reduced image. By performing color processing using determined parameters, color processing in which adaptation corresponding to environment is taken into consideration is realized.

6 Claims, 6 Drawing Sheets

IMAGE CONVERSION PROCESSING METHOD AND APPARATUS, AND RECORDING MEDIUM

BACKGROUND OF THE INVENTION

1. Field of the Invention

This invention relates to an image processing method and apparatus, and a recording medium in which conditions relating to chromatic-adaptation conversion processing are set according to manual instructions.

2. Description of the Related Art

It has been known that the same color is often observed as different colors depending on environmental light and background colors. This is because human vision characteristics change depending on environment for observing an image. This phonemenon is generally called adaptation.

As the assignee of the present application has proposed, methods for performing color processing in consideration of adaptation corresponding to environmental light have recently been devised.

For example, in U.S. Ser. No. 683,704 (filed Jul. 17, 1996), an image processing apparatus for performing color processing corresponding to environmental light when displaying a previewed image has been proposed. In this image processing apparatus, a plurality of correction data corresponding to typical types of enviromental light are stored in advance, and color processing corresponding to environmental light is realized by the user's selection of the environmental light.

In general office environment, various light sources can be considered as environmental light. It is also possible to form a new light source by mixing a plurality of light sources (e.g. sunlight and an incandescent lamp). Although the mechanism of human adaptation has not yet been completely clarified, it is known that human adaptation is influenced by various factors other than environmental light.

In the above-described image forming apparatus, although excellent color matching can be realized for typical types of environmental light, excellent color matching cannot be realized depending on environment. Hence, there is enough room for improvement.

Image processing apparatuses in which the hue of a displayed image is corrected by the user's manual adjustment of the gamma of a monitor have been known.

However, since the user who does not have preliminary knowledge does not know how to change the gamma of a monitor, the user can obtain desired adjustment only after performing trial-and-error processing several times. In addition, since adaptation corresponding to environmental light is not taken into consideration, it is impossible to perform sufficient color correction.

As described above, the prior art and the technique proposed by the assignee of the present application cannot perform high-precision color correction in which adaptation corresponding to observing environment is taken into consideration, and therefore there is enough room for improvement.

SUMMARY OF THE INVENTION

It is an object of the present invention to realize color correction adapted to various observing environments.

It is another object of the present invention to allow for a user who does not have preliminary knowledge to easily set adjustment for performing color correction adapted to an observing environment.

According to one aspect, the present invention which achieves these objectives relates to an image processing method for performing chromatic-adaptation conversion processing corresponding to an observing environment. The method includes the steps of displaying a plurality of sample images corresponding to each of different chromatic-adaptation conversion processes, setting each of chromatic-adaptation conversion conditions based on a sample image selected according to a user's manual instruction, and performing color processing based on the set chromatic-adaptation conversion conditions.

According to another aspect, the present invention which achieves these objectives relates to an image processing apparatus for performing chromatic-adaptation conversion processing corresponding to an observing environment. The apparatus includes means for displaying a plurality of sample images corresponding to each of different chromatic-adaptation conversion processes, means for setting each of chromatic-adaptation conversion conditions based on a sample image selected according to a user's manual instruction, and means for performing color processing based on the set chromatic-adaptation conversion conditions.

According to still another aspect, the present invention which achieves these objectives relates to a recording medium which stores a program for realizing an image processing method for performing chromatic-adaptation conversion processing corresponding to an observing environment so as to be read by a computer. The program includes the steps of displaying a plurality of sample images corresponding to each of different chromatic-adaptation conversion processes, setting each of chromatic-adaptation conversion conditions based on a sample image selected according to a user's manual instruction, and performing color processing based on the set chromatic-adaptation conversion conditions.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described in detail with reference to the drawings.

FIGS. 1 through 4 are diagrams illustrating an outline of a color matching method according to the embodiment.

Figure 1:
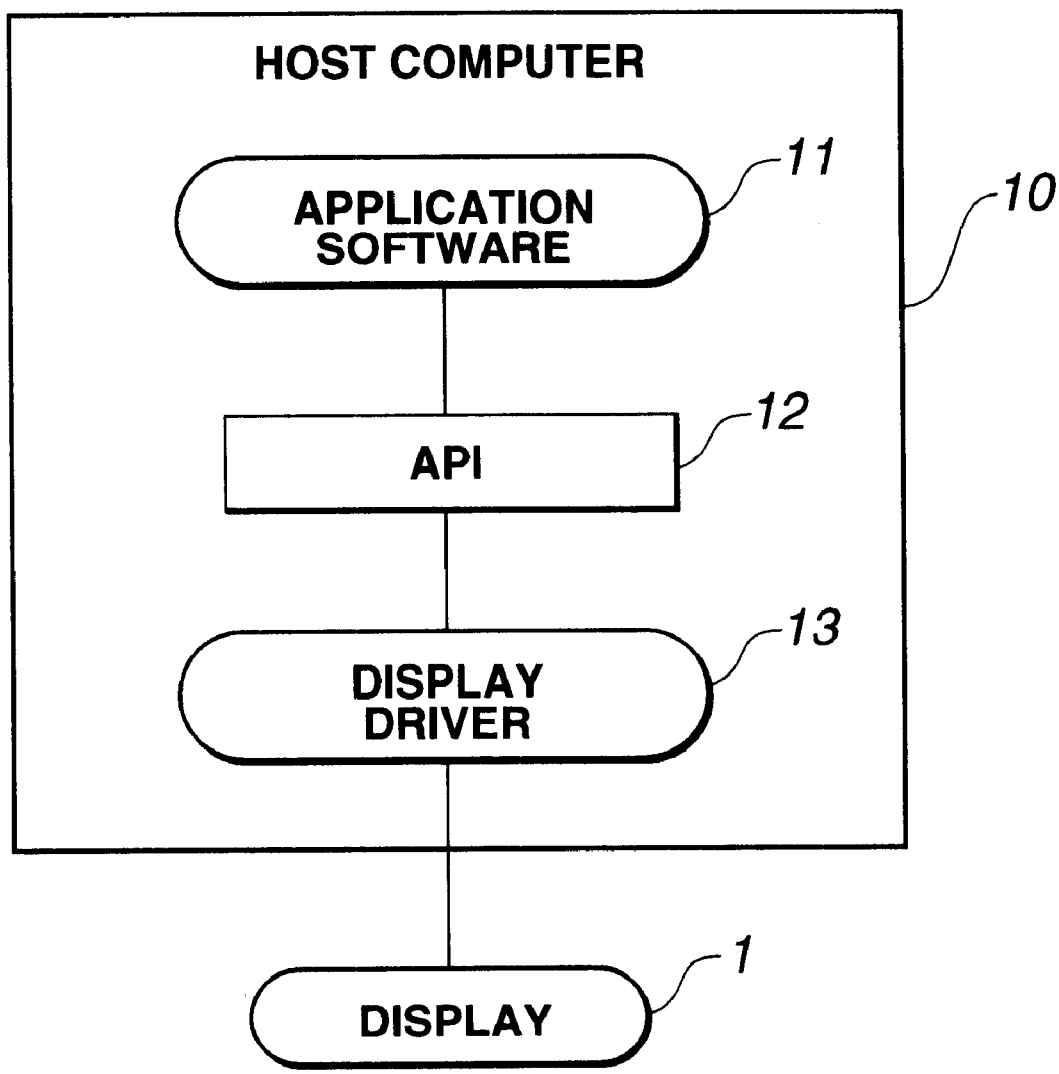
FIG. 1 is a diagram illustrating the relationship between application software and a driver which execute color matching processing according to an embodiment of the present invention.

FIG. 1 is a diagram illustrating the relationship between application software and a driver which execute color matching processing according to the embodiment. As shown in FIG. 1, application software 11 in a host computer 10 is connected to a display driver 13 via an API (application programming interface) 12. In this embodiment, the application software 11 executes color matching processing, and displays color-temperature parameters and color-rendering parameters on the display 1 as parameters for colors (to be described in detail later). According to the user's sequential selection for each display, a parameter closest to that of an original is determined.

Figure 2:
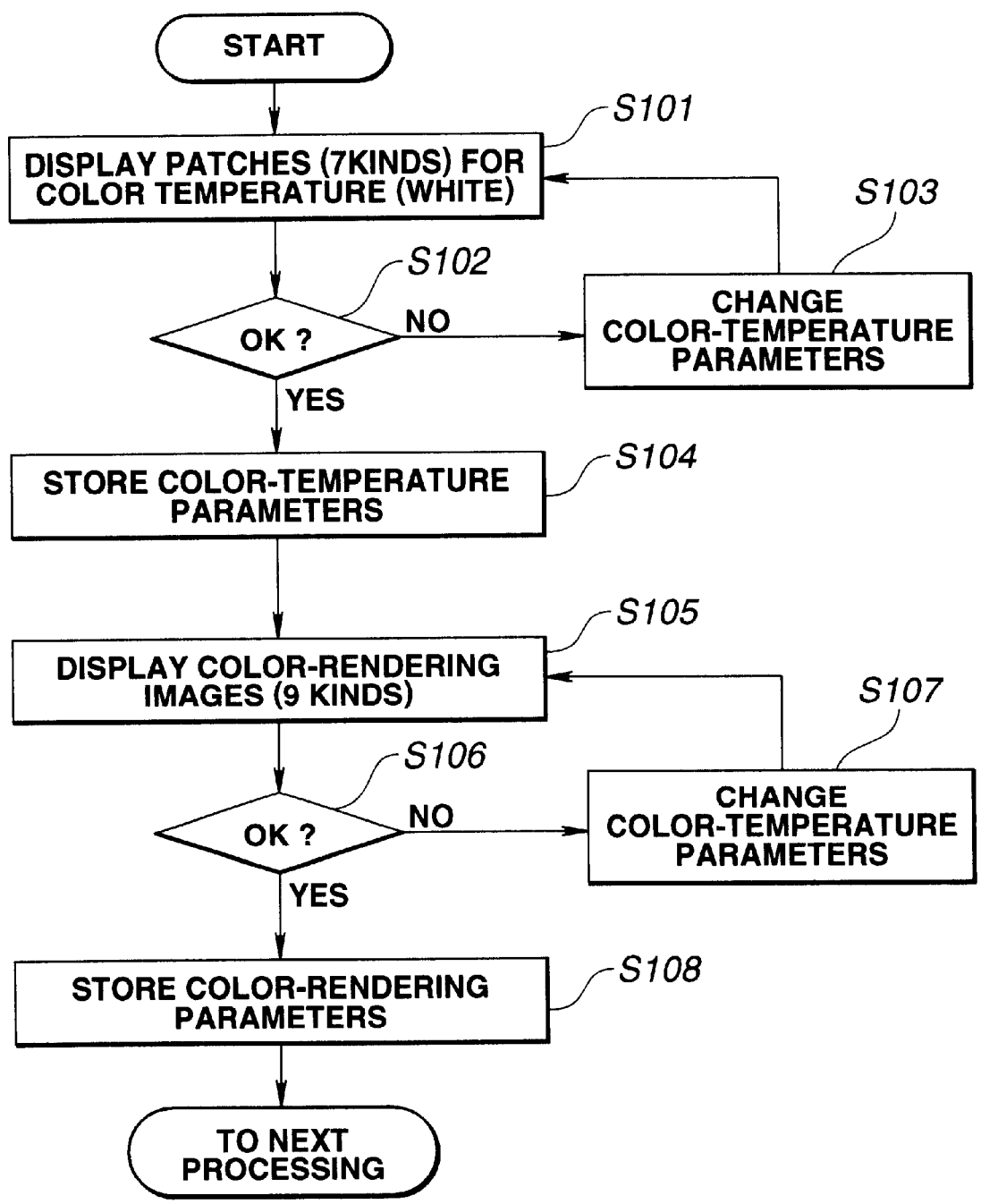
FIG. 2 is a flowchart illustrating the color matching processing of the embodiment.

FIG. 2 is a flowchart illustrating color matching processing in the embodiment. First, in step S101, processing for determining a color temperature, serving as a parameter for a color, is performed. More specifically, as shown in FIG. 3, in order to adjust a white background of an original, plain patches are displayed on the display 1.

Figure 3:
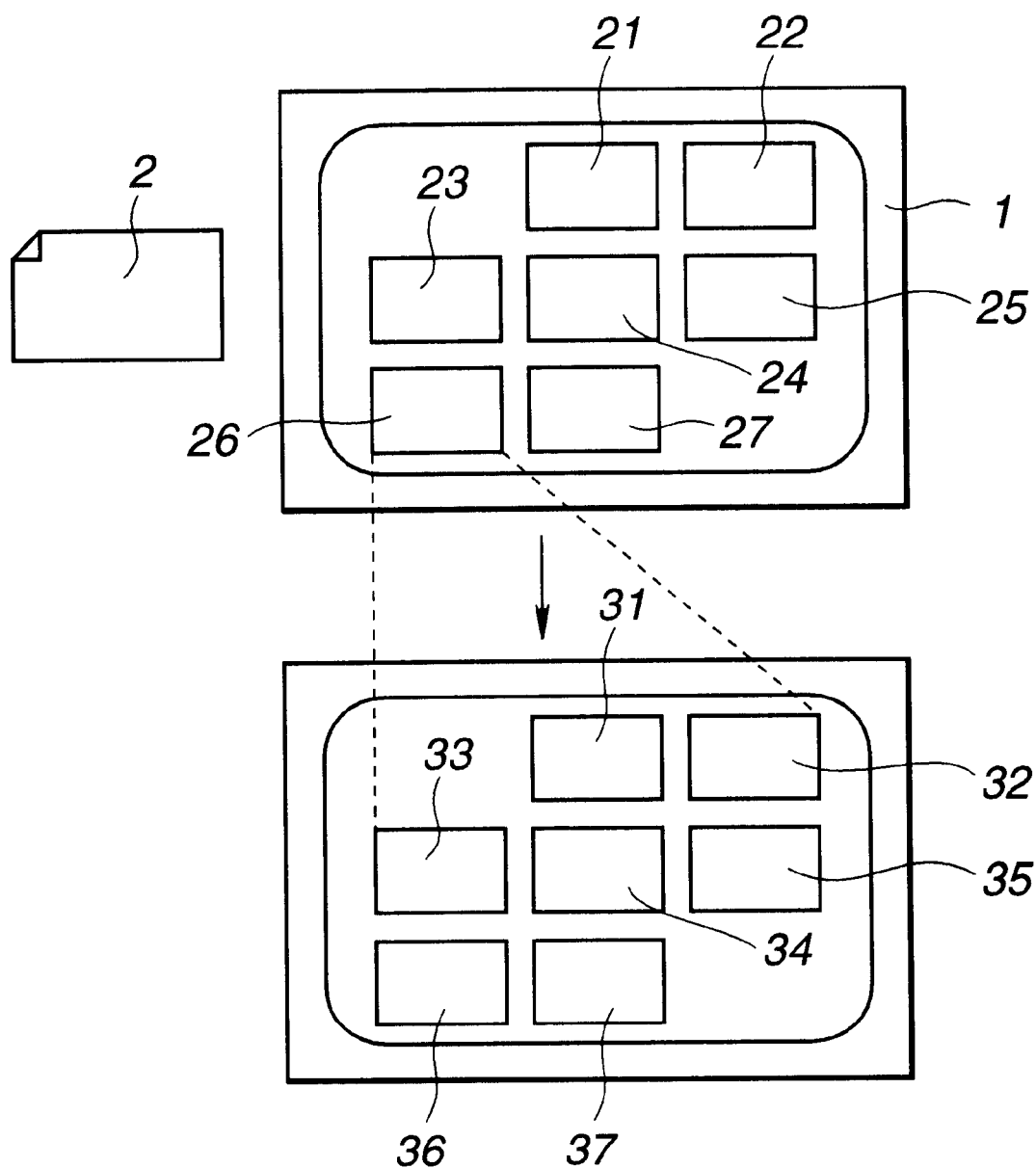
FIG. 3 is a diagram illustrating states of display of color temperatures, serving as parameters for colors, according to the embodiment.

FIG. 3 is a diagram illustrating states of display of color temperatures, serving as parameters for colors, according to the embodiment. In FIG. 3, the display 1 is connected to a host computer or like (not shown). After being read by a scanner or the like (not shown), an original 2 is placed alongside the display 1. Reference numerals 21–37 represent images of the original read by the scanner and displayed on the display 1 in a reduced size. In the case of FIG. 3, a plurality of (seven) reduced images are displayed. In the seven reduced images, color temperatures, serving as parameters for colors, are changed.

First, as a procedure for determining a color temperature, image data having different color temperatures are formed and displayed as shown in FIG. 3. In the image data having different color temperatures, tristimulus values X0, Y0 and Z0 of an address (i, j) of the image data of the original 2 are converted into L*a*b* of a uniform color space, HV/C of the Muncell color system, or the like, and colors are shifted by ΔE (a constant color difference).

Reference numeral 24 shown in FIG. 3 represents a central image. Images 21 and 27 are obtained by changing only the lightness of the central image 24 to higher and lower values, respectively. Images 22 and 26 are obtained by changing only the saturation of the central image 24 to higher and lower values, respectively. Images 23 and 25 are obtained by changing only the hue of the central image 24 to positive and negative directions, respectively, where the positive direction is a direction changing from red purple to yellow green.

Returning to FIG. 2, in the next step S102, the user is asked to select the patch of a color which is close to the color of the original from among the displayed images 21–27 shown in FIG. 3. If the user has selected the central image 24, it means that the color temperature coincides, and the process proceeds to step S104. If the user has selected an image other than the central image 24, for example, the image 26, the process proceeds to step S103, where parameters are changed, and the process returns to step S101, where a group of color patches around the image 26 (images 31–37 shown in FIG. 3) is displayed on the display 1. In step S103, seven reduced images are formed, for example, by reducing the value ΔE every time processing is repeated.

The above-described processing is repeated until the central image is selected. Upon completion of color-temperature matching, the process proceeds to step S104, where the selected color-temperature parameter is stored.

Figure 4:
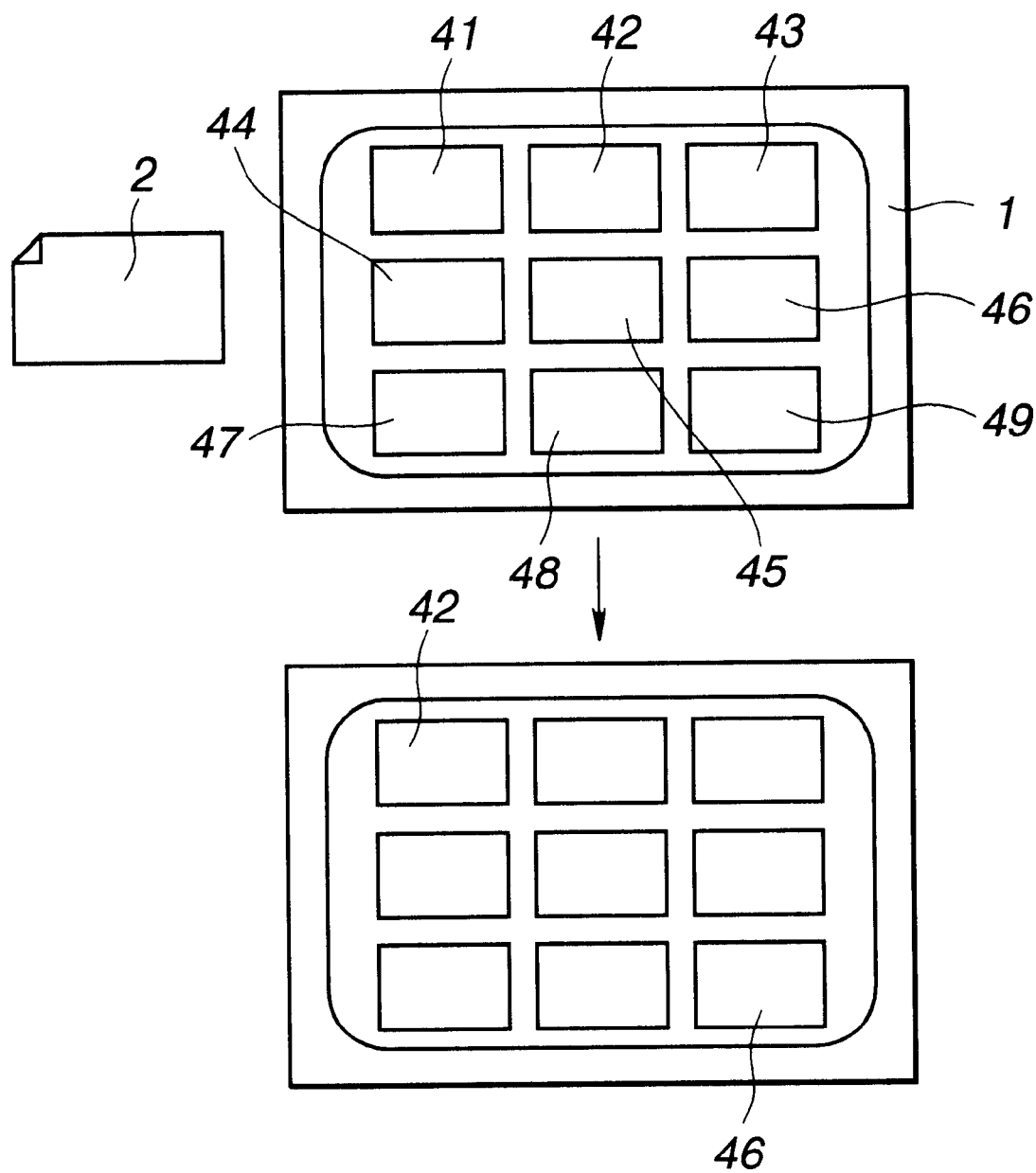
FIG. 4 is a diagram illustrating states of display of images representing color-rendering properties, serving as parameters for colors, according to the embodiment.

Then, in step S105, in order to determine the color rendering property, serving as a parameter for a color, images for the color rendering property are displayed on the display 1, as shown in FIG. 4. FIG. 4 is a diagram illustrating states of display of images representing the color rendering property, serving as a parameter for a color, according to the embodiment.

It is desirable that the original has various colors. As for the color rendering property, differences in color signals from spectral-energy distributions of typical light sources, such as sunlight, an illuminant A (a halogen lamp) and a flurorescent lamp are calcualted in advance, correction data, such as a correction matrix, an LUT (look-up table) or the like, is obtained, and corrected images are displayed.

Returning to FIG. 2, in the next step S106, the user is asked to select two kinds of images representing color rendering properties close to the color rendering property of the original, for example, from among displayed images 41–49 shown in FIG. 4, and images obtained by mixing the selected two kinds of images are displayed on the display 1 as images of the next picture surface. For example, if the selected images are images 42 and 46, the image 42 is displayed at the upper left of the picture surface, images obtained by mixing the images 42 and 46 are then sequentially displayed, and the image 46 is displayed at the lower right of the picture surface. The user is asked to select an image having a color close to the color of the original from among the displayed images. In step S108, the selected color-rendering parameter is stored. If an image having a color close to the color of the original is not displayed, the process proceeds to step S107, where color-rendering parameters are changed. The process then returns to step S105, and the above-described processing is repeated. Color-rendering parameters (correction data) are formed by changing the amount of weighting for each corrected data of the selected two kinds of images and synthesizing the obtained data.

Figure 5:
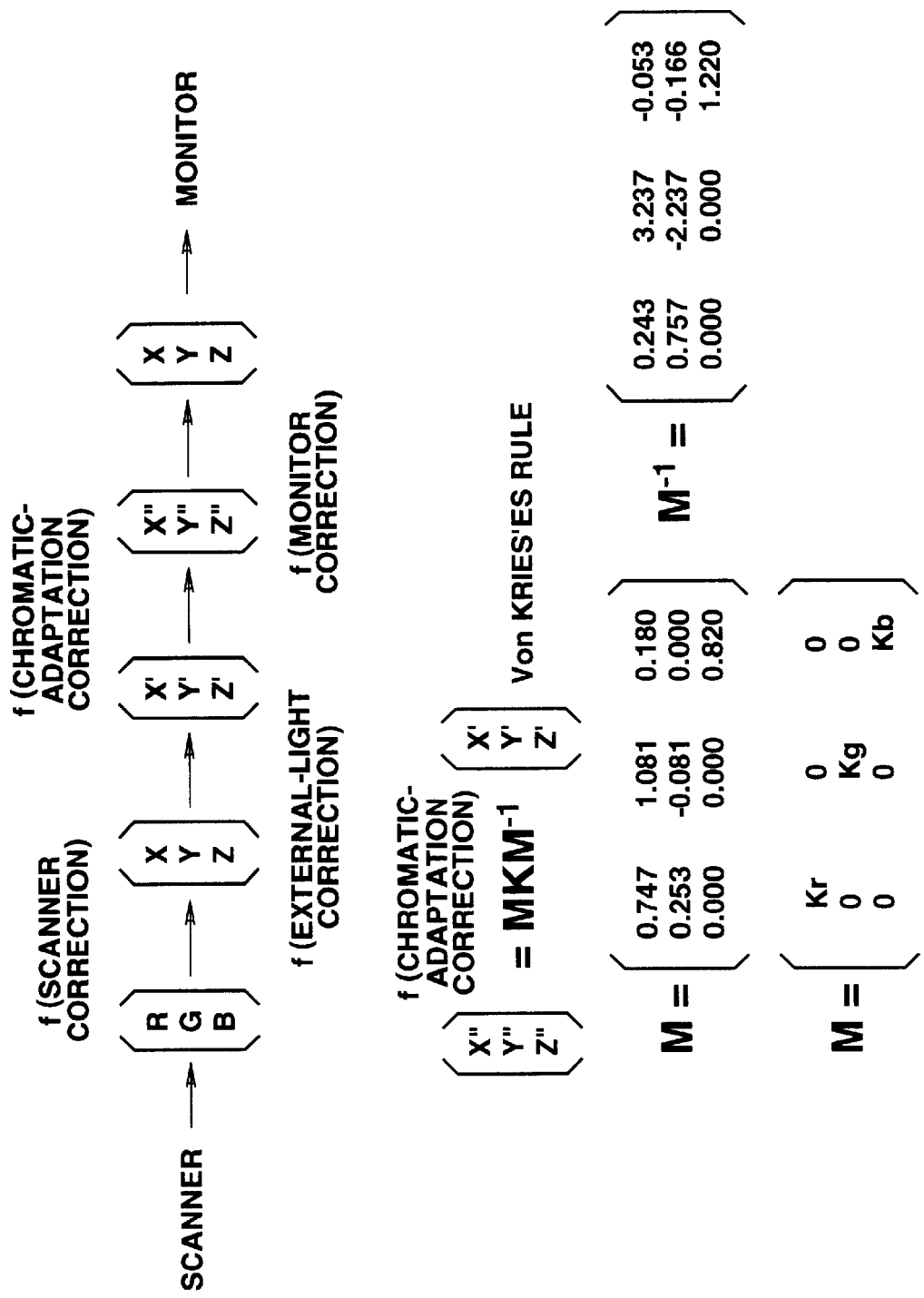
FIG. 5 is a diagram illustrating color conversion processing according to the embodiment.

A method for generating images displayed in order to determine the above-described parameters for a color will now be described. FIG. 5 is a diagram illustrating color conversion processing according to the embodiment.

First, the original is read by the scanner, and R, G and B luminance signals are converted into X, Y and Z by f (scanner correction) conversion of read image data. Although various methods have been proposed for this conversion, a conversion method using a 3×3 matrix is adopted in this embodiment. This matrix is formed by obtaining X, Y and Z by measuring in advance color patches or the like of the original, and arranging values so that the R, G and B values read by the scanner are close to the measured X, Y and Z values using, for example, the least square method. Then, in external-light correction, a 3×3 matrix (the color temparature and color rendering property of external light) having diagonal components X', Y' and Z' equal to the color temperature of the monitor is formed.

Then, in chromatic-adaptation correction, as shown in FIG. 3, patches or images having parameters of seven colors are displayed on the display 1 for the white background of the original 2. X", Y" and Z" (or a color space, such as L*a*b* or the like) of the patches displayed on the display 1 are converted into R, G and B for the monitor. Since the color temperature, phosphors (fluorescent colors) and gamma of the monitor are known in advance, it is possible to obtain the coefficients of the 3×3 matrix of f (monitor-color correction). If the user selects one of seven displayed patches, the color temperature of external light is known, and coefficients Kr, Kg and Kb of chromatic-adaptation correction can be obtained from the Von Kries'es rule.

Figure 6B:
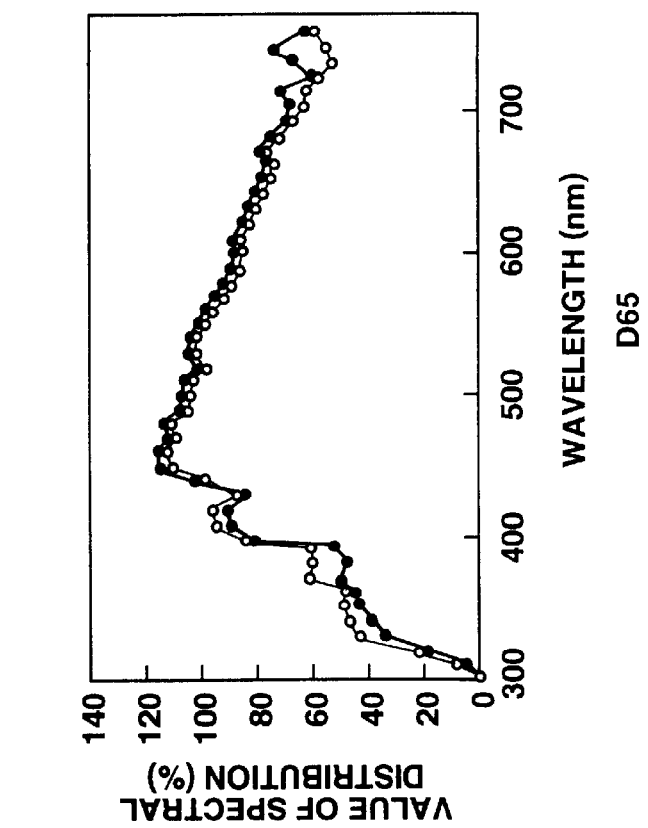
FIGS. 6(*a*) and 6(*b*) are graphs illustrating spectral energy distributions of typical light sources, i.e., a fluorolescent lamp and a D65 standard light source, respectively.
Figure 6A:
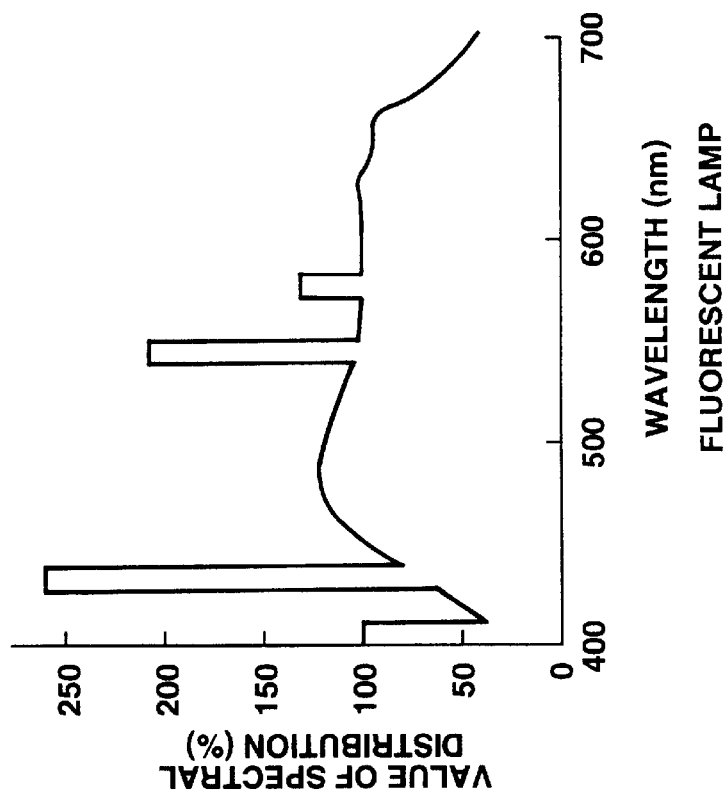

Then, as shown in FIG. 4, images having different color rendering properties are displayed. For example, a natural image is used for the original 2. When the user selects an image to determine a color-rendering parameter in the above-described manner, the matrix of f (external correction) can be obtained. FIGS. 6(*a*) and 6(*b*) are graphs illustrating the spectral energy distributions of typical light sources, i.e., a fluorescent lamp and a D65 standard light source, respectively. If the spectral energy distribution of the light source for illuminating the original 2 differs, the hue of the original 2 is observed, of course, as different from the color displayed on the display 1.

As described above, acording to the embodiment, by displaying images having different parameters for colors on a display and asking the user to sequentially select an image close to an original from among a plurality of images, it is possible to easily find out a parameter of a color close to the original. It is thereby possible to perform display close to the original even if the user lacks knowledge about parameters for colors or a measuring apparatus is not used.

Furthermore, since parameters relating to the color temperature and the color rendering property are independently set, it is possible to efficiently set parameters for realizing color matching processing in which adaptation corresponding to environment is taken into consideration.

In addition, since parameters are generated based on an image selected by the user, it is possible to realize color matching processing adapted to various environments.

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may, of course, be also achieved by supplying a system or an apparatus with a storage medium storing program codes of software for realizing the functions of the above-described embodiment, and reading and executing the program codes stored in the storage medium by a computer (or a CPU (central processing unit) or an MPU (microprocessor unit)) of the system or the apparatus.

In such a case, the program codes themselves read from the storage medium realize the functions of the above-described embodiment, so that the storage medium storing the program codes constitutes the present invention.

For example, a floppy disk, a hard disk, an optical disk, a magnetooptical disk, a CD (compact disk)-ROM (read-only memory), a CD-R (recordable), a magnetic tape, a nonvolatile memory card, a ROM or the like may be used as the storage medium for supplying the program codes.

The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiment are realized by the processing.

The individual components shown in outline or designated by blocks in the drawings are all well-known in the image processing method and apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method for performing conversion processing corresponding to an observing environment, said image processing method comprising:
   a first display step, of displaying a plurality of white patches corresponding to each of different color-temperature conditions;
   a first set step, of setting a conversion condition based on white patches which are selected in accordance with a manual instruction by a user;
   a second display step, of displaying a plurality of color images corresponding to each of different color-rendering conditions;
   a second set step, of setting color-rendering conditions based on color images which are selected in accordance with a manual instruction by the user; and
   a perform step, of performing color processing based on the set conversion conditions.

2. An image processing method according to claim 1, wherein the color images are selected after the white patches are selected.

3. An image processing method according to claim 1, wherein the plurality of color images obtained by mixing color rendering conditions of the selected color images are displayed.

4. An image processing method according to claim 1, wherein the color processing is chromatic-adaptation processing.

5. An image processing apparatus for performing conversion processing corresponding to an observing environment, said image processing apparatus comprising:
   a first display unit adapted to display a plurality of white patches corresponding to each of different color-temperature conditions;
   a first set unit adapted to set a conversion condition based on white patches which are selected in accordance with a manual instruction by a user;
   a second display unit adapted to display a plurality of color images corresponding to each of different color-rendering conditions;
   a second set unit, adapted to set color-rendering condition based on color images which are selected in accordance with a manual instruction by the user; and
   a color processing unit adapted to perform color processing based on the set conversion conditions.

6. A recording medium containing a program for executing an image processing method for performing conversion processing corresponding to an observing environment, wherein said program comprises:

code for a first display step, of displaying a plurality of white patches corresponding to each of different color-temperature conditions;

code for a first set step, of setting a conversion condition based on white patches which are selected in accordance with a manual instruction by a user;

code for a second display step, of displaying a plurality of color images corresponding to each of different color-rendering conditions;

code for a second set step, of setting color-rendering conditions based on color images which are selected in accordance with a manual instruction by the user; and code for a perform step, of performing color processing based on the set conversion conditions.

\* \* \* \* \*